US012683944B2

(12) United States Patent
Schmitz et al.

(10) Patent No.: US 12,683,944 B2
(45) Date of Patent: Jul. 14, 2026

(54) CONNECTOR DEPLOYMENT WITHIN A CONNECTIVITY FRAMEWORK

(71) Applicant: SAP SE, Walldorf (DE)

(72) Inventors: Christian Schmitz, Porto Alegre (BR); Peter Schoenau, Stuttgart (DE); Silvio Normey Gomez, Santana do Livramento (BR); Mitchell Gudmundson, Colorado Springs, CO (US)

(73) Assignee: SAP SE, Walldorf (DE)

( * ) Notice: Subject to any disclaimer, the term of this patent is extended or adjusted under 35 U.S.C. 154(b) by 218 days.

(21) Appl. No.: 18/772,498

(22) Filed: Jul. 15, 2024

(65) Prior Publication Data

US 2025/0279988 A1     Sep. 4, 2025

Related U.S. Application Data

(60) Provisional application No. 63/560,189, filed on Mar. 1, 2024.

(51) Int. Cl.
H04L 41/12 (2022.01)
H04L 9/40 (2022.01)

(52) U.S. Cl.
CPC .............. H04L 63/08 (2013.01); H04L 41/12 (2013.01); H04L 63/029 (2013.01)

(58) Field of Classification Search
None
See application file for complete search history.

(56) References Cited

U.S. PATENT DOCUMENTS

| | | | | |
|---|---|---|---|---|
| 2016/0217403 A1* | 7/2016 | Gupte | ................. | H04L 41/5051 |
| 2017/0351741 A1* | 12/2017 | Seah | ..................... | G06F 3/0484 |
| 2019/0281138 A1* | 9/2019 | Trost | ...................... | H04L 67/10 |
| 2020/0403858 A1* | 12/2020 | Nassar | ................... | G06F 16/903 |
| 2021/0314236 A1* | 10/2021 | Savov | ...................... | H04L 63/08 |
| 2021/0344602 A1* | 11/2021 | Lewin | ..................... | H04L 45/10 |
| 2023/0388383 A1* | 11/2023 | Venkatesh | .............. | H04L 12/66 |
| 2025/0156493 A1* | 5/2025 | Leclerc | ................... | G06F 16/27 |

* cited by examiner

*Primary Examiner* — Joshua Joo
(74) *Attorney, Agent, or Firm* — Buckley, Maschoff & Talwalkar LLC

(57)     ABSTRACT

Systems and methods include execution of a first instance of a connector registry service to receive a first registration request from a first instance of a first connector to a first data system, the first registration request comprising a first connector identifier, a first connection type and a first endpoint type, store the first connector identifier, the first connection type and the first endpoint type in a data store, read a plurality of associated connector identifiers, connection types and endpoint types from the data store, the plurality of associated connector identifiers, connection types and endpoint types including the first connector identifier, the first connection type and the first endpoint type, and transmit the plurality of associated connector identifiers, connection types and endpoint types to a first instance of a gateway service.

20 Claims, 8 Drawing Sheets

| | Connector | | ⟋—310 |
|---|---|---|---|
| char36 | namespace | PK | |
| char36 | id | PK | |
| string | name | | |
| bool | multi_tenant_capable | | |
| bool | external_connector | | |
| string | description | | |
| char10 | latest_version | | |
| timestamp | date_added | | |
| timestamp | date_modified | | | versions

| | ConnectorVersion | | ⟋—320 |
|---|---|---|---|
| char36 | namespace | PK | |
| char36 | connector_id | PK | |
| char10 | connector_version | PK | |
| string | endpoint | | |
| string[] | allowed_driver_fingerprints | | |
| timestamp | date_added | | |
| timestamp | date_modified | | | responsibleFor

| | ConnectionAndEndpointTypes | | ⟋—330 |
|---|---|---|---|
| char32 | namespace | PK | |
| char32 | connector_id | PK | |
| char10 | connector_version | PK | |
| char255 | connection_type | PK | |
| char255 | connection_version | PK | |
| char255 | endpoint_type | PK | |

FIG. 3

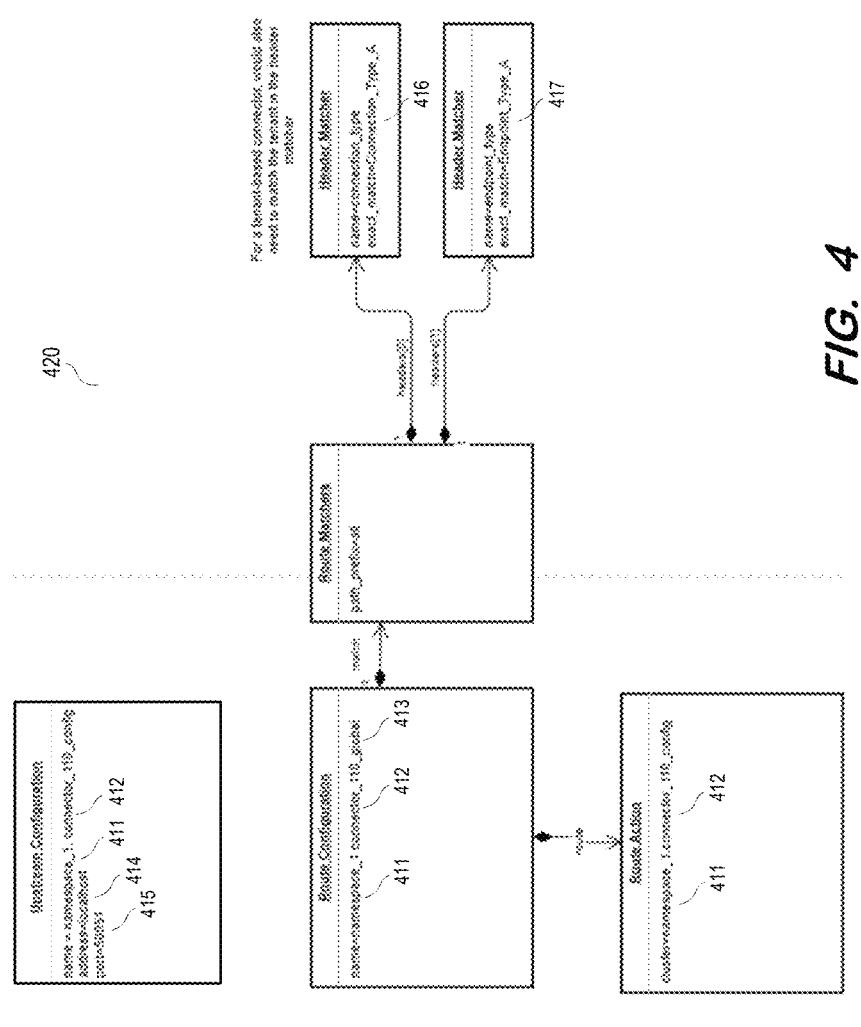
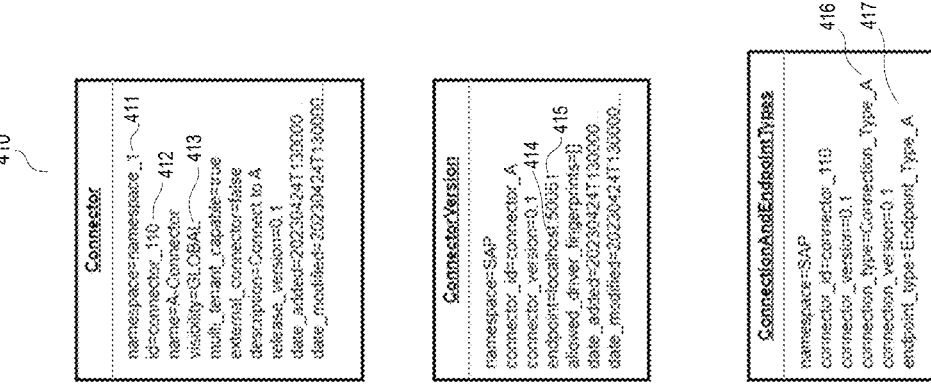
FIG. 4

CONNECTOR DEPLOYMENT WITHIN A CONNECTIVITY FRAMEWORK

CROSS-REFERENCE TO RELATED APPLICATIONS

The present application claims priority to and the benefit of U.S. Provisional Patent Application No. 63/560,189, filed Mar. 1, 2024, under 35 U.S.C. § 119(e). The contents of U.S. Provisional Patent Application No. 63/560,189 are incorporated herein for all purposes.

BACKGROUND

Modern organizations generate, process and store vast amounts of data. This data may be stored in various data stores and accessed by various applications. Different data stores are differently suited for storing different types of data. Moreover, a given application may use different types of data associated with different requirements.

The particular data stores in which data of an application are stored may be selected based on many factors, including but not limited to a desired redundancy, a desired accessibility, a desired processing speed, and a desired security protocol. Due to these considerations, application data may be stored across multiple databases, file storages, file systems, and external data sources such as third-party vendors, cloud services, and cloud databases.

The diversity of data stores increases the complexity of data integration. For example, the more types of data stores which are used within an application landscape, the more difficult it is to seamlessly pull and push data and metadata from the data stores. Problems arise at least due to the difficulty in properly configuring the application to connect to and interact with the data stores. In addition, existing middleware for routing communication between an application and its data stores suffers from poor scalability and extensibility.

BRIEF DESCRIPTION OF THE DRAWINGS

FIG. 3 is an entity relationship diagram for a connector registry persistency model according to some embodiments.

FIG. 4 illustrates entities of a gateway control plane according to some embodiments.

DETAILED DESCRIPTION

Embodiments may provide scalable, resilient, observable, extensible, and high-performance connectivity with disparate data systems.

Figure 1:
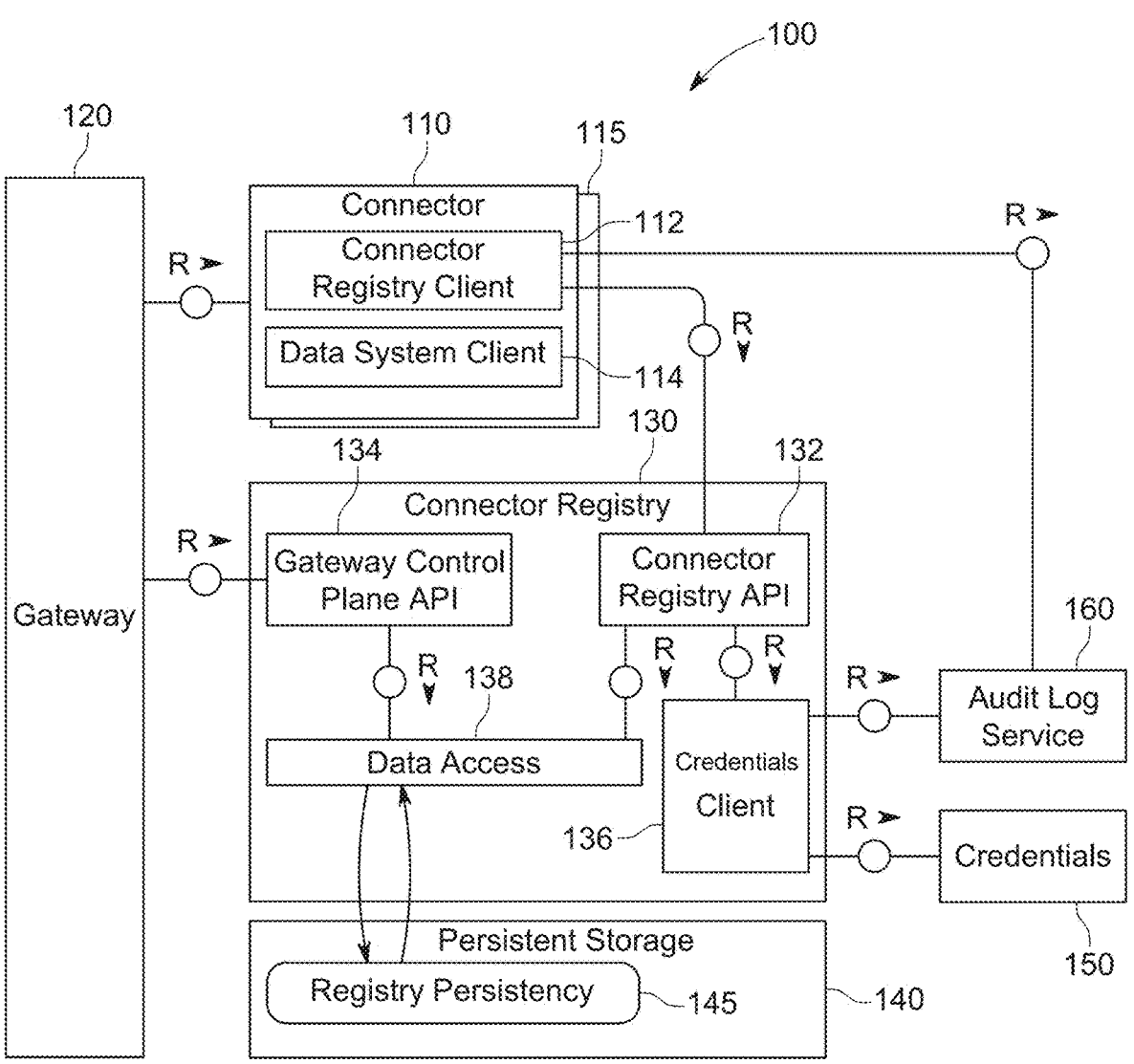
FIG. 1 illustrates a framework for connecting to data systems according to some embodiments.

FIG. 1 illustrates landscape 100 according to some embodiments. Landscape 100 may comprise any number of hardware and software components which provide functionality to one or more users (not shown). The components may be implemented using any suitable combinations of computing hardware and/or software that are or become known. Such combinations may include on-premise servers, cloud-based servers, and/or elastically-allocated virtual machines. In some embodiments, two or more components are implemented by a single computing device.

Landscape 100 comprises connectors 110 and 115, which provide integration with data and metadata stored by data systems of different connection and endpoint types. Examples of connection types include but are not limited to ABAP, Google BigQuery, and S4/HANA Cloud, and examples of endpoint types include but are not limited to Web Socket RFC (WSRFC), REST, and Content Distribution Internetworking (CDI). Gateway 120 receives an incoming request for access to a data system of a particular connection type and endpoint type and routes the incoming request to a connector corresponding to the connection type, endpoint type and tenant. Connector registry 130 provides routing information to gateway 120 and connection details to deployed connectors 110 and 115. Connection details may include information needed to connect to a data system, such as hostname, port, username, password, certificates, etc. Connector registry 130 may also manage connector registration, cache connection details and notify connectors 110, 115 of connection detail updates and connection invalidations.

Embodiments may implement any number of connectors, each of which is associated with one or more respective connection types, endpoint types and tenants. A connector implements logic for reading and writing data and metadata from and to a data system instance of the connection type and endpoint type with which the connector is associated. Each connector 110, 115 implements and exposes the same well-defined and parametrizable connector API which may be called by a consumer to interact with a data system of the connection type and endpoint type associated with the connector. For example, via the API, connector 110 may receive requests from gateway 120 for data read and write, metadata read and write, and data definition. Data system client 114 may convert the requests from a data model of connectors 110, 115 to a data model of a connection type and endpoint type with which connector 110 is associated and transmit the request to a data system using drivers, service invocations, or other methods of the data system. Similarly, data system client 114 may receive responses from a data system and convert the responses from the data model of the data system to the data model of connectors 110, 115.

A connector may provide a consumer with information specifying its characteristics and capabilities. Connectors 110, 115 may conform to a capability model which obliges a consumer to send commands to read or write data within the set of operations delimited by the connector's capabilities, According to some embodiments, each connector 110, 115 is a separate microservice that exposes and implements the connector API. Each microservice (i.e., connector) may be provided by a plurality of pods executing connector instances in one or more nodes of a container orchestration system as is known in the art. Landscape 100 may be a cloud-native and decoupled architecture in which gateway 120 and connector registry 130 each also comprise separate microservices implemented by a respective one or more nodes. Consequently and advantageously, each of connector 110, 115, gateway 120 and connector registry 130 may scale elastically (e.g., by adding/deleting pods and/or nodes) according to their respective workloads. All microservices described herein may communicate with one another and with other unshown microservices using lightweight network communication mechanisms such as a resource API via Hyper Text Transfer Protocol (HTTP) request-response messages, but embodiments are not limited thereto.

According to some embodiments, landscape 100 uses gRPC for communication among the components, Protocol Buffers as an interface description language for message, service, and API definitions, and a data wire format such as Apache Arrow. Connectors 110, 115, gateway 120 and registry 130 may execute on an application server that runs and operates applications on Kubernetes.

Connector registry 130 comprises connector registry API 132, gateway control plane API 134, and credentials client 136. Connector registry 130 maintains, monitors, and exposes connectivity to the connection type and endpoint type registered by each individual connector. Connector registry 130 keeps track of the available connectors serving connectivity and the runtime instances of the connectors.

Connector registry API 132 may comprise a bi-directional gRPC API. During bootstrapping, connector registry client 112 of connector 110 invokes connector registry API 132 to register its information with connector registry 130. The information may include, for example, connector identifier, connector version, configuration, connection type, endpoint type, and supported tenants. Connector registry API 132 calls data access object 138 to persist the connector-specific information in registry persistency 145 of persistent storage 140, which may in some embodiments consist of cloud-based persistent storage. Registry persistency 145 may synchronize with the infrastructure layer of landscape 100 to also maintain a list of the available instances (e.g., running pods) for each registered connector.

Gateway control plane API 134 provides routing information to gateway 120. Gateway 120 caches the routing information and uses it to route all incoming traffic to the proper connector. Gateway 120 routes incoming requests to connectors based on connection information (e.g., connection identifier, connection type, endpoint type, tenant) specified by the requests. Routing may be based on other types of information specified in a request. Gateway 120 may comprise an L7 load balancer that supports HTTP/2 and connections multiplexing, which allows the reuse of the same TCP socket for multiple HTTP connections.

Gateway 120 can survive outages of gateway control plane API 134 using cached routing information, at least until the routing information stored in registry persistency 145 changes. Routing information stored in registry persistency 145 may change due to asynchronous registration or de-registration of connectors. To keep the routing information of gateway 120 up-to-date, gateway 120 may maintain a live gRPC stream to gateway control plane API 134. Accordingly, gateway control plane API 134 may regularly pull routing information from registry persistency 145 of persistent storage 140 via data access object 138 and determine whether any of the routing information has changed. If so, all current routing information (or just the changed routing information) stored in registry persistency 145 is transmitted to gateway 120. According to some embodiments, prior to transmission of the routing information stored gateway control plane API 134 translates routing information entities corresponding to the connector data model into entities (e.g., clusters, endpoints, listeners, and routes) of the data model of gateway 120.

As mentioned above, gateway 120 may be implemented using multiple instances. When a new instance is deployed, the instance calls gateway control plane API 134 to create a gRPC bi-directional stream and thereafter calls the gateway control plane API 134 to retrieve a routing configuration including all current routing information from registry persistency 145.

Connector registry API 132 provides RPCs for connectors to retrieve connection details such as hostname, port, username, and password associated with a connection ID. Connection details may also include certificates and connection-specific drivers. Connector registry API 132 retrieves the connection details from credentials client 136, which connects to credentials component 150 to obtain the connection details. Credentials component 150 may comprise a secure storage system in which a user (e.g., a tenant administrator) stores connection details for data systems to which the user has access, and where each data system (and the connection details thereof) is associated with a connection type, endpoint type and tenant. In some embodiments, credentials client 136 includes an in-memory cache mechanism to buffer connection details to avoid unnecessary calls to credentials component 150 and provide resilience in case of communication issues with credentials component 150.

For example, in response to receipt of a request for connection details from a connector, credentials client 136 may determine whether the requested details are in its cache. If not, the details are requested from credentials component 150, cached by credentials client 136, and returned to the requesting connector via API 132. If the requested details are found in the cache of credentials client 136, credentials client 136 forwards an audit record to audit log service 160 to fulfill security and auditing requirements and returns the details to the requesting connector.

Figure 2:
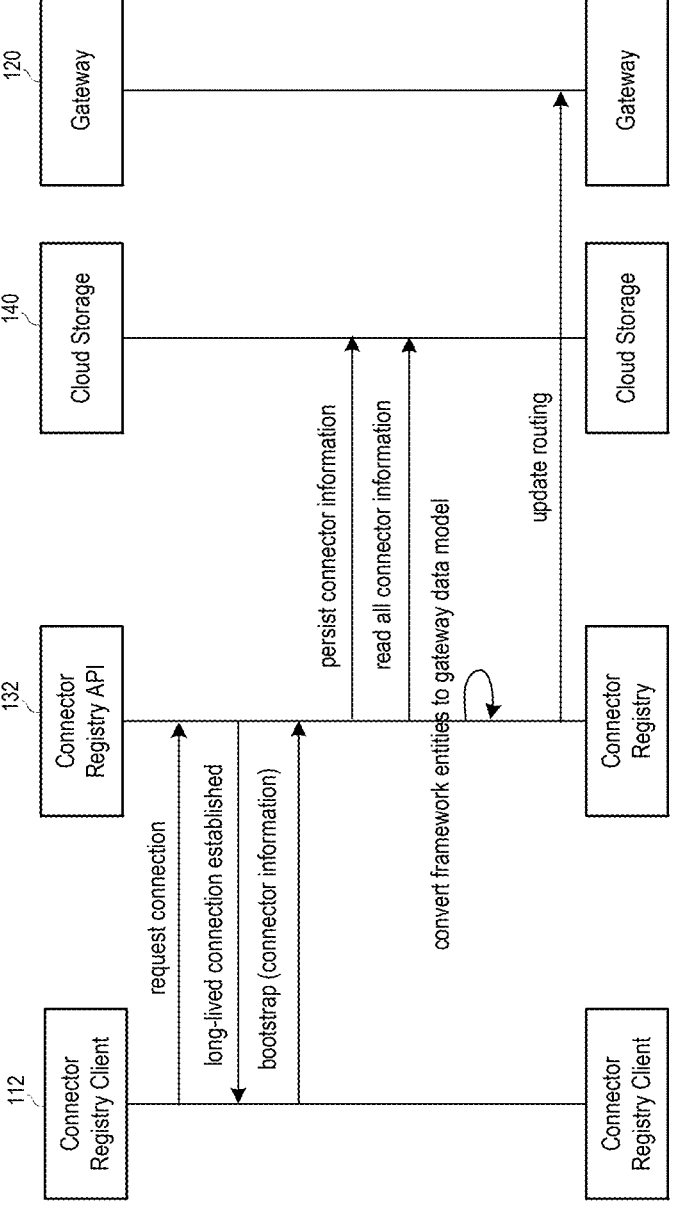
FIG. 2 is a sequence diagram of registering a connector within a framework for connecting to data systems according to some embodiments.

FIG. 2 is a sequence diagram illustrating registration of a connector within a framework according to some embodiments. Process 200 and the other processes described herein may be performed using any suitable combination of hardware and software. Program code embodying these processes may be stored by any non-transitory tangible medium, including a fixed disk, a volatile or non-volatile random-access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture.

FIG. 2 will be described with respect to the components of landscape 100, but embodiments are not limited thereto. During bootstrap of connector 110, connector registry client 112 requests a connection with connector registry API 132 to open a long-lived gRPC channel therewith. This channel acts as a corridor for actions to be executed during bootstrap and across the life of connector 110.

Using the corridor, connector registry client 112 calls connector registry API 132 and provides connector information. The connector information may include a connector identifier the connection type and endpoint type to which connector 110 provides connectivity, the associated tenant (if not multi-tenant), connector version, the endpoint of the registering connector instance, and any remaining configuration information needed for operation of connector 110 and routing of incoming requests. API 132 then translates the connector information into native entities of a connector registry persistency data model.

FIG. 3 shows an entity relationship diagram for a connector registry persistency data model according to some embodiments. Each of entities Connector 310, Connector-Version 320 and ConnectionAndEndpoint 330 includes a namespace field to express ownership. A connector may be owned by a provider of landscape 100, a partner thereof, or a tenant who developed connector 110, for example.

The translated connector information is persisted in persistent storage 140. Next, connector registry API 132 reads all the persisted connector information from persistent storage 140 and converts the entities of the read connector information to a data model of gateway 120. FIG. 4 illustrates entities 410 of a connector registry persistency data model which may be persisted in cloud storage, and corresponding entities 420 of a gateway data model converted from entities 410 according to some embodiments. FIG. 4 also illustrates the population of various fields of entities 420 with values 411-417 of corresponding fields of entities 410.

Connector registry API 132 sends the converted connector information to gateway 120 to update its internal routing configuration. Accordingly, gateway 120 is provided with a routing configuration based on the connector information currently stored in persistency 145 of persistent storage 140.

Figure 5:
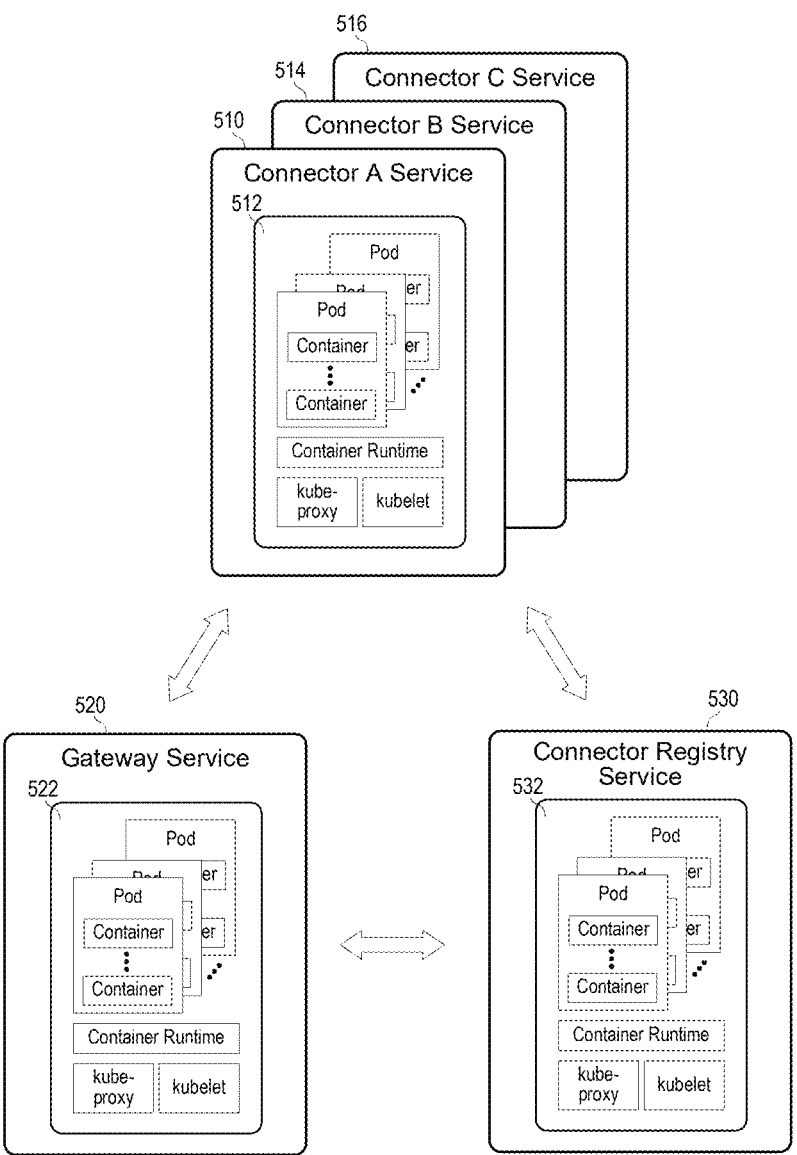
FIG. 5 illustrates clusters providing implementing components of a framework for connecting to data systems according to some embodiments.

FIG. 5 illustrates microservice implementations of connectors 510, 514 and 516 gateway 520 and connector registry 530 according to some embodiments. Each of services 510, 514, 516, 520 and 530 may be implemented by a plurality of pods of a container orchestration platform such as but not limited to Kubernetes. As such, each service may include a node executing several pods, in which each pod executes a separate instance of the service. Each node 512, 522 and 532 is a virtual or physical machine including kubelet for node and container management, kube-proxy for a network proxy, and a container runtime (e.g., Docker) to run container.

Although FIG. 5 illustrates one node 512, 522 and 532 per service, any service may include any number of nodes, each executing its own set of one or more pods. A master node (not shown) of each service may adjust the number of pods, the number of nodes and/or the computing resources of each node as desired. The adjustment may be based on expected workload or any other factors. For example, if an expected workload is greater than a first threshold, one or more additional pods are created. If the expected workload is less than a second threshold, one or more of pods are terminated.

Accordingly, each of connector services 510, 514, 516 may be implemented by several connector instances and connector registry service 530 may be implemented by several connector registry instances, in which all instances execute independently and in parallel. If a connector registry client of a connector instance registers its connector information with a connector registry API of a connector registry instance as described with respect to FIG. 2, all other connector registry instances will initially be unaware of the registration. Accordingly, to establish a consistent state of connection information throughout the landscape, each running connector registry instance may periodically read the connector information from the shared cloud storage and push the connector information to the gateway instance(s) to which it is connected.

Figure 6:
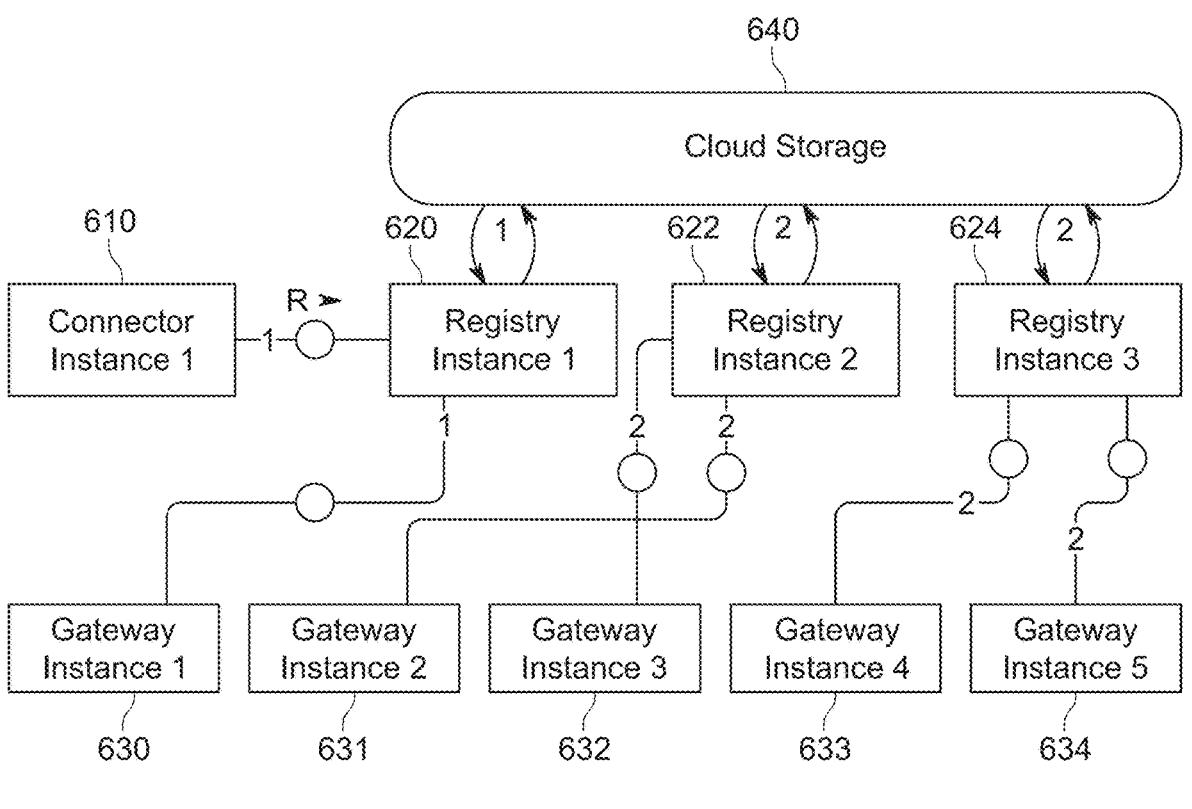
FIG. 6 illustrates distribution of connector information among instances of components of a framework according to some embodiments.

FIG. 6 illustrates connections between a connector instance, various instances of a connector registry and various instances of a gateway according to some embodiments. Specifically, FIG. 6 shows one running connector instance 610, three running connector registry instances 620, 622 and 624, and five running gateway instances 630-634. Each of gateway instances 630-634 is connected to one of connector registry instances 620, 622 and 624 and maintains a gRPC long-lived channel therewith. Connector instance

620 sends its connection information to connector registry instance 620 for storage in cloud storage 640 and connector registry instance 620 updates the connector information of gateway instance 630. To avoid a globally inconsistent state, remaining connector registry instances 622 and 624 periodically pull connector information from cloud storage 640 and push the connector information to gateway instances 630-634 through the gRPC long-lived channels. Specifically, connector registry instance 622 pushes the connector information to gateway instances 631 and 632 using its gateway control plane API and connector registry instance 623 pushes the connector information to gateway instances 633 and 634 using its gateway control plane API.

Figure 7:
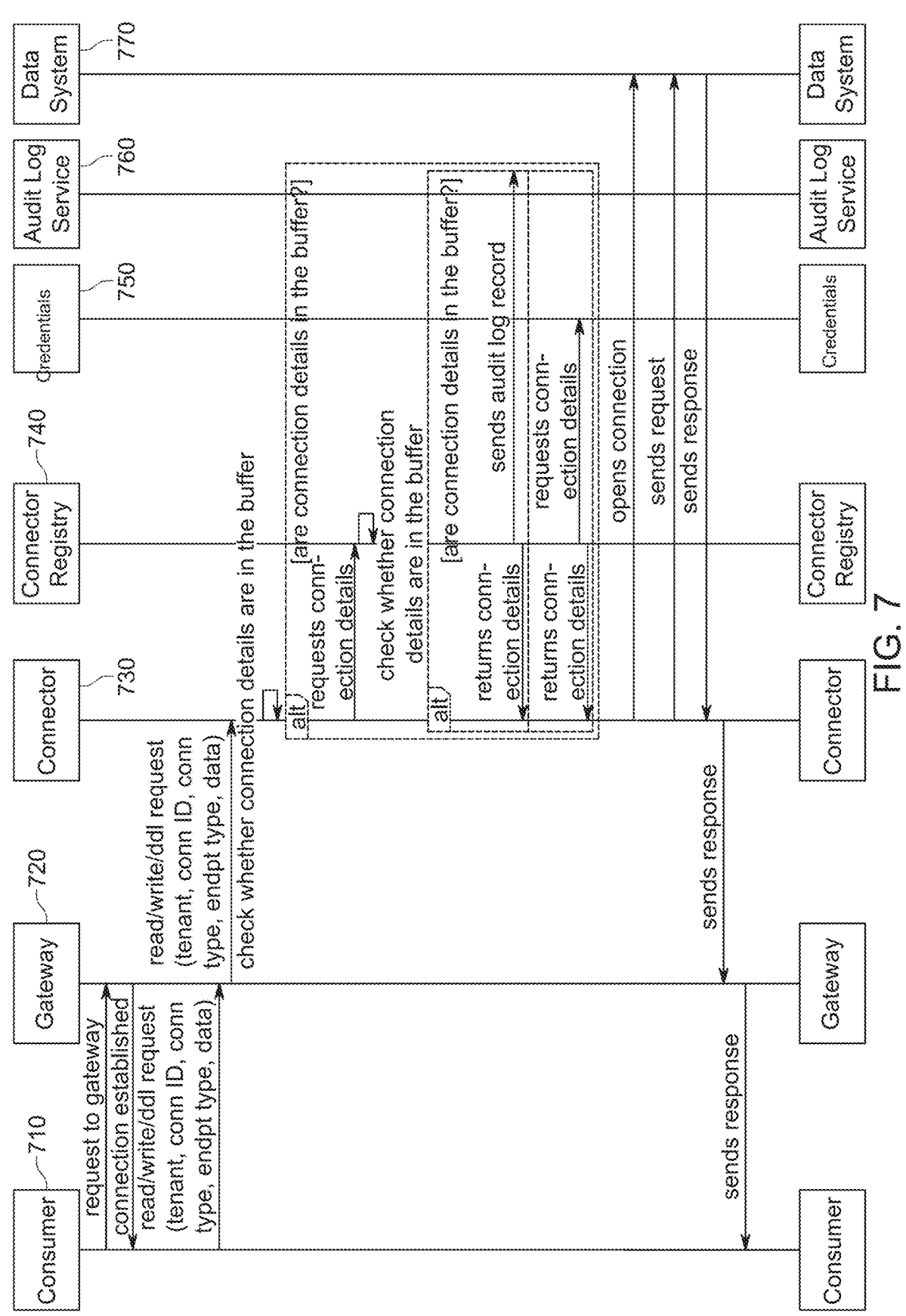
FIG. 7 is a sequence diagram of using a registered connector to connect to a data system according to some embodiments.

FIG. 7 is a sequence diagram illustrating a request from a consumer to a connector. The request may comprise a request to read data/metadata, a request to write data, or a Data Description Language request.

Consumer 710 may comprise a computing device which uses a client component library to communicate with gateway 720. The client component library may encapsulate the communication and actions between consumer 710 and gateway 720. The client component library may be tasked with managing gRPC connections, checking the backend and connectors' health status, security, resilience, and other aspects.

Initially, consumer 710 sends a request to create a channel to gateway 720 via the client component library. A gRPC channel is established and consumer 710 consumer uses the client component library to send a request that will read or modify the state of the database in target data system 770. The request includes connection information (e.g., connection type, endpoint type, connection identifier and tenant). Advantageously, the request need not specify any particular connector or any connection details for connecting to target data system 770.

Based on the received connection information and its stored routing information, gateway 720 routes the request to corresponding connector 730. After receiving the request, connector 730 determines whether connection details corresponding to the connection ID of the request are stored in its in-memory buffer. If not, connector 730 calls connector registry 740 (e.g., using a connector registry client as described above) to ask for the connection details based on the connection ID and the requester tenant. Connector registry 740 then determines whether connection details corresponding to the connection ID and tenant is in its in-memory buffer. If so, connector registry 740 sends an audit log record to audit log service 760 and returns the connection details to connector 730. If the connection details are not in its buffer, connector registry 740 calls credentials component 750 to request the connection details, receives the connection details therefrom, and sends the connection details back to connector 730.

Connector 730 uses the connection details (and, for example, a data system client component) to establish a connection with target data system 770. Next, connector 730 sends the request to data system 770, receives a result, and returns the result to consumer 710 via gateway 720.

Figure 8:
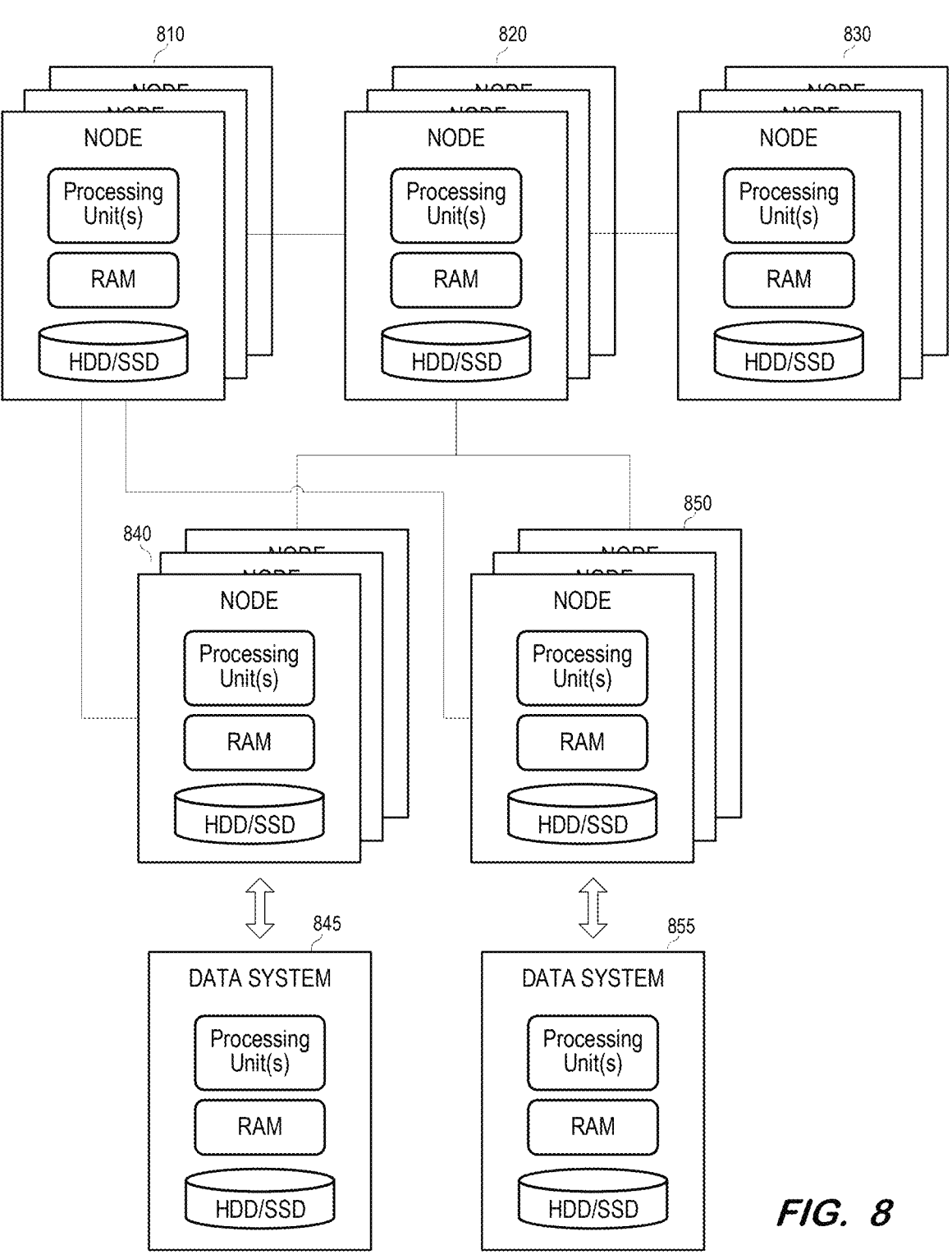
FIG. 8 illustrates a hardware implementation of a cluster-implemented framework according to some embodiments.

FIG. 8 illustrates a cloud-based deployment according to some embodiments. The illustrated components may comprise cloud-based resources residing in one or more public or private clouds providing self-service and immediate provisioning, autoscaling, security, compliance and identity management features.

Each illustrated node may comprise a physical or virtual machine of a Kubernetes cluster. Nodes 810 may execute instances of a gateway while nodes 820 may execute instances of a connector registry. Nodes 830 may comprise a database service for storing connection information. Nodes 840 may execute instances of a first connector and nodes 850 may execute instances of a second connector. The instances of the first connector may communicate with data system 845 and the instances of the second connector may communicate with data system 855.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of networks and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:

a memory storing program code;

one or more processing units to execute the program code to:

execute a first instance of a connector registry service to:

receive a first registration request from a first instance of a first connector to a first data system, the first registration request comprising a first connector identifier, a first connection type and a first endpoint type;

store the first connector identifier, the first connection type and the first endpoint type in a data store;

read a plurality of associated connector identifiers, connection types and endpoint types from the data store, the plurality of associated connector identifiers, connection types and endpoint types including the first connector identifier, the first connection type and the first endpoint type; and transmit the plurality of associated connector identifiers, connection types and endpoint types to a first instance of a gateway service.

2. A system according to claim 1, the one or more processing units to execute the program code to cause the system to:

convert the plurality of associated connector identifiers, connection types and endpoint types from a data model of the first connector to a data model of the gateway service, wherein transmission of the plurality of associated connector identifiers and connection types comprises transmission of the converted plurality of associated connector identifiers and connection types.

3. A system according to claim 1, the one or more processing units to execute the program code to cause the system to:

execute a second instance of the connector registry service to:

read the plurality of associated connector identifiers, connection types and endpoint types from the data store; and transmit the plurality of associated connector identifiers, connection types and endpoint types to a second instance of the gateway service and to a third instance of the gateway service.

4. A system according to claim 3, the one or more processing units to execute the program code to cause the system to:

receive a second request from a second instance of the first connector for connection details associated with the first connector identifier;

in response to the second request, determine a hostname, port and user credentials associated with the first connector identifier; and return the hostname, port and user credentials to the second instance of the first connector.

5. A system according to claim 4, wherein determination of the hostname, port and user credentials associated with the first connector identifier comprises:

determination of whether the hostname, port and user credentials associated with the first connector identifier are not stored in a cache of the system; and in response to the determination, requesting of the hostname, port and user credentials associated with the first connector identifier from a second system.

6. A system according to claim 1, the one or more processing units to execute the program code to cause the system to:

receive a second request from a second instance of the first connector for connection details associated with the first connector identifier;

in response to the second request, determine a hostname, port and user credentials associated with the first connector identifier; and return the hostname, port and user credentials to the second instance of the first connector.

7. A system according to claim 6, wherein determination of the hostname, port and user credentials associated with the first connector identifier comprises:

determination that the hostname, port and user credentials associated with the first connector identifier are not stored in a cache of the system; and in response to the determination that the hostname, port and user credentials associated with the first connector identifier are not stored in the cache of the system, requesting of the hostname, port and user credentials associated with the first connector identifier from a second system.

8. A system according to claim 1, the one or more processing units to execute the program code to:

execute a second instance of the connector registry service to:

read the plurality of associated connector identifiers, connection types and endpoint types from the data store; and transmit the plurality of associated connector identifiers, connection types and endpoint types to a second instance of the gateway service; and execute a third instance of the connector registry service to:

receive a second registration request from a first instance of a second connector to a second data system, the second registration request comprising a second connector identifier, a second connection type and a second endpoint type;

store the second connector identifier, the second connection type and the second endpoint type in the data store;

read a second plurality of associated connector identifiers, connection types and endpoint types from the data store, the second plurality of associated connector identifiers, connection types and endpoint types including the second connector identifier, the second connection type and the second endpoint type; and transmit the second plurality of associated connector identifiers, connection types and endpoint types to a third instance of the gateway service.

9. A system according to claim 8, the one or more processing units to execute the program code to:

execute the second instance of the connector registry service to:

read the second plurality of associated connector identifiers, connection types and endpoint types from the data store; and transmit the second plurality of associated connector identifiers, connection types and endpoint types to the second instance of the gateway service; and execute the first instance of the connector registry service to:

read the second plurality of associated connector identifiers, connection types and endpoint types from the data store; and transmit the second plurality of associated connector identifiers, connection types and endpoint types to the first instance of the gateway service.

10. A method comprising:

receiving, at a first instance of a connector registry service, a first registration request from a first instance of a first connector to a first data system, the first registration request comprising a first connector identifier and a first connection type;

storing, by the first instance of the connector registry service, the first connector identifier and the first connection type in a data store;

reading, by the first instance of the connector registry service, a plurality of associated connector identifier and connection types from the data store, the plurality of associated connector identifiers and connection types including the first connector identifier and the first connection type; and transmitting, by the first instance of the connector registry service, the plurality of associated connector identifiers and connection types to a first instance of a gateway service and to a second instance of the gateway service.

11. A method according to claim 10, further comprising:

converting, by the first instance of the connector registry service, the plurality of associated connector identifiers and connection types from a data model of the first connector to a data model of the gateway service, wherein transmitting the plurality of associated connector identifiers and connection types comprises transmitting, by the first instance of the connector registry service, the converted plurality of associated connector identifiers and connection types.

12. A method according to claim 10, further comprising:

executing a second instance of the connector registry service to:

read the plurality of associated connector identifiers and connection types from the data store; and transmit the plurality of associated connector identifiers and connection types to a third instance of the gateway service.

13. A method according to claim 12, further comprising:

receiving, at the second instance of the connector registry service, a second request from a second instance of the first connector for connection details associated with the first connector identifier;

in response to the second request, determining, by the second instance of the connector registry service, a hostname, port and user credentials associated with the first connector identifier; and returning, by the second instance of the connector registry service, the hostname, port and user credentials to the second instance of the first connector.

14. A method according to claim 13, wherein determining the hostname, port and user credentials associated with the first connector identifier comprises:

determining, by the second instance of the connector registry service, whether the hostname, port and user credentials associated with the first connector identifier are not stored in a cache; and in response to the determination that the hostname, port and user credentials associated with the first connector identifier are not stored in the cache, requesting, by the second instance of the connector registry service, the hostname, port and user credentials associated with the first connector identifier from a system.

15. A method according to claim 10, further comprising:

receiving, at the first instance of the connector registry service, a second request from a second instance of the first connector for connection details associated with the first connector identifier;

in response to the second request, determining, by the first instance of the connector registry service, a hostname, port and user credentials associated with the first connector identifier; and returning, by the first instance of the connector registry service, the hostname, port and user credentials to the second instance of the first connector.

16. A method according to claim 15, wherein determining the hostname, port and user credentials associated with the first connector identifier comprises:

determining that the hostname, port and user credentials associated with the first connector identifier are not stored in a cache; and in response to the determination that the hostname, port and user credentials associated with the first connector identifier are not stored in the cache, requesting the hostname, port and user credentials associated with the first connector identifier from a system.

17. A method according to claim 10, further comprising:

executing a second instance of the connector registry service to:

read the plurality of associated connector identifiers, connection types and endpoint types from the data store; and transmit the plurality of associated connector identifiers and connection types to a third instance of the gateway service; and execute a third instance of the connector registry service to:

receive a second registration request from a first instance of a second connector to a second data system, the second registration request comprising a second connector identifier and a second connection type;

store the second connector identifier and the second connection type in the data store;

read a second plurality of associated connector identifiers and connection types from the data store, the second plurality of associated connector identifiers and connection types including the second connector identifier and the second connection type; and transmit the second plurality of associated connector identifiers and connection types to a fourth instance of the gateway service.

18. A method according to claim 17, further comprising:

executing the second instance of the connector registry service to:

read the second plurality of associated connector identifiers and connection types from the data store; and transmit the second plurality of associated connector identifiers and connection types to the third instance of the gateway service; and execute the first instance of the connector registry service to:

read the second plurality of associated connector identifiers and connection types from the data store; and transmit the second plurality of associated connector identifiers and connection types to the first instance of the gateway service and to the second instance of the gateway service.

19. One or more non-transitory computer-readable media storing program code that, when executed by a computing system, cause the computing system to perform operations comprising:

receiving, at a first instance of a connector registry service, a first registration request from a first instance of a first connector to a first data system, the first registration request comprising a first connector identifier and a first connection type;

storing, by the first instance of the connector registry service, the first connector identifier and the first connection type in a data store;

reading, by the first instance of the connector registry service, a plurality of associated connector identifier and connection types from the data store, the plurality of associated connector identifiers and connection types including the first connector identifier and the first connection type;

transmitting, by the first instance of the connector registry service, the plurality of associated connector identifiers and connection types to a first instance of a gateway service and to a second instance of the gateway service;

receiving, at a second instance of the connector registry service, a second registration request from a first instance of a second connector to a second data system, the second registration request comprising a second connector identifier and a second connection type;

storing, by the second instance of the connector registry service, the second connector identifier and the second connection type in the data store;

reading, by the second instance of the connector registry service, a second plurality of associated connector identifiers and connection types from the data store, the second plurality of associated connector identifiers and connection types including the second connector identifier and the second connection type; and transmitting, by the second instance of the connector registry service, the second plurality of associated connector identifiers and connection types to a third instance of the gateway service, wherein the first instance of the connector registry service reads the second plurality of associated connector identifiers and connection types from the data store and transmits the second plurality of associated connector identifiers and connection types to the first instance and the second instance of the gateway service.

20. One or more non-transitory computer-readable media according to claim 19, where the program code, when executed by a computing system, causes the computing system to perform operations comprising:

receiving, at the first instance of the connector registry service, a second request from a second instance of the first connector for connection details associated with the first connector identifier;

in response to the second request, determining, by the first instance of the connector registry service, a hostname, port and user credentials associated with the first connector identifier; and returning, by the first instance of the connector registry service, the hostname, port and user credentials to the second instance of the first connector.

* * * * *